United States Patent [19]

Spentzas

[11] 4,053,985
[45] Oct. 18, 1977

[54] MECHANICAL PROTRACTOR

[76] Inventor: Nick E. Spentzas, 594 Rozanne Drive, Addison, Ill. 60101

[21] Appl. No.: 679,015

[22] Filed: Apr. 21, 1976

[51] Int. Cl.² .......................... G01B 3/12; G01B 5/00; G01B 7/00
[52] U.S. Cl. .................................. 33/1 N; 33/1 PT; 33/141.5; 33/142
[58] Field of Search .................. 33/1 N, 1 PT, 141.5, 33/142, 174 R

[56] References Cited

U.S. PATENT DOCUMENTS

| 1,711,791 | 5/1929 | Kambo | 33/141.5 |
| 2,495,974 | 1/1950 | Kelley | 33/141.5 |
| 2,878,566 | 3/1959 | Mellen | 33/1 N |
| 3,497,959 | 3/1970 | Engelsman | 33/142 |
| 3,882,606 | 5/1975 | Kaenel et al. | 33/142 |

Primary Examiner—Richard E. Aegerter
Assistant Examiner—Richard R. Stearns
Attorney, Agent, or Firm—Mason, Kolehmainen, Rathburn & Wyss

[57] ABSTRACT

A device for measuring and indicating the angle between two lines includes a housing having two wheels rotatably mounted therein. The wheels are spaced from each other at a distance predeterminedly related to the radii of the wheels. In one embodiment, a shaft is affixed at a first end to the first wheel. The second end of the shaft extends through the second wheel and is secured to a pointer disposed adjacent to the second wheel. The second wheel is calibrated with indicia indicating the relative rotation of the first and second wheels in degrees so that the position of the pointer relative to the indicia indicates the angle measured by the device. One of the wheels may also include a toothed wheel for transmitting the rotation of the wheel to a linear distance indiating device for measuring the total linear distance traveled by the device. Also disclosed is an embodiment employing electrical components for electrically measuring the angle and providing an indication of the measured angle.

18 Claims, 9 Drawing Figures

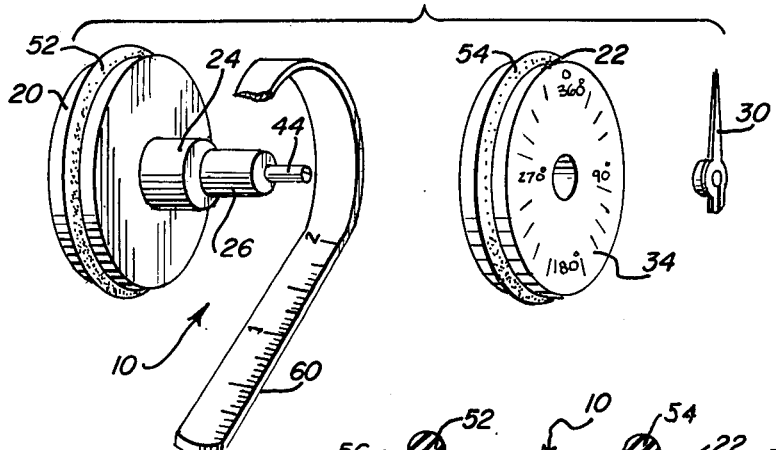
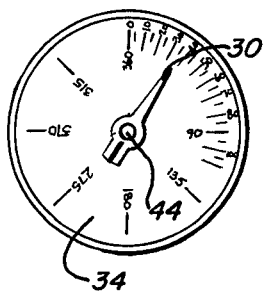
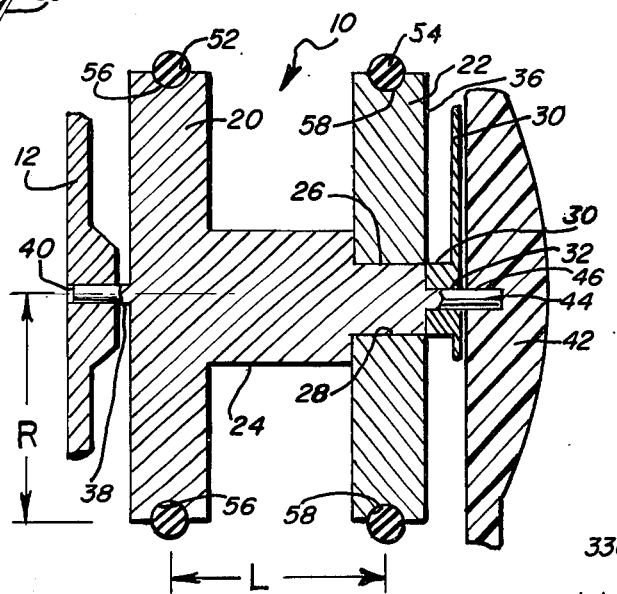
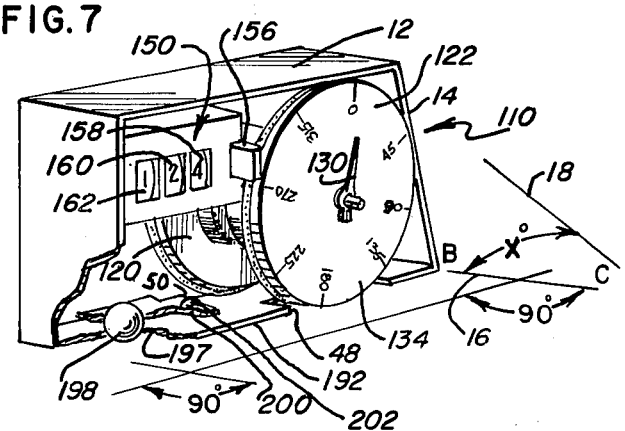
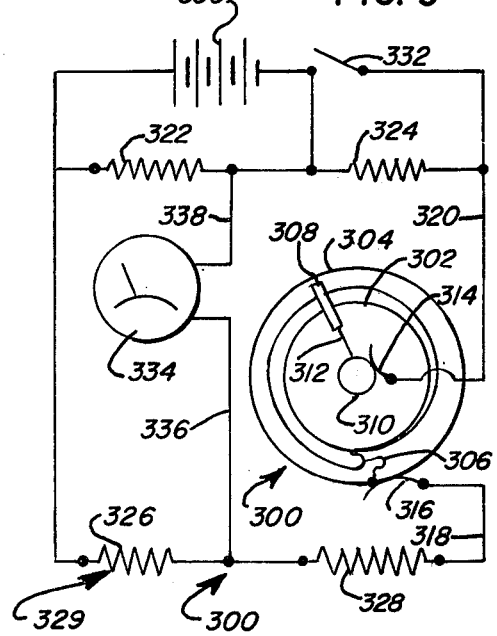

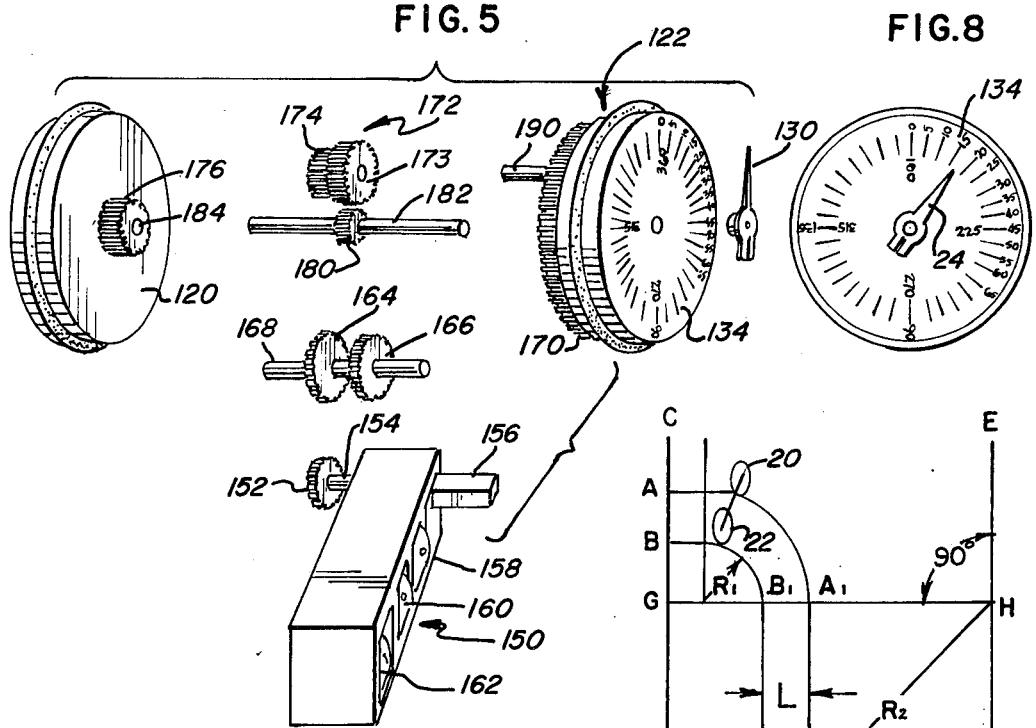
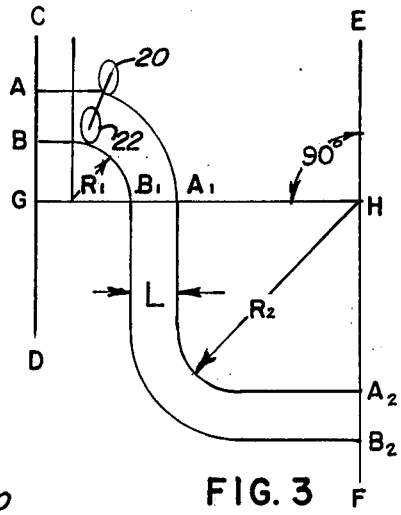
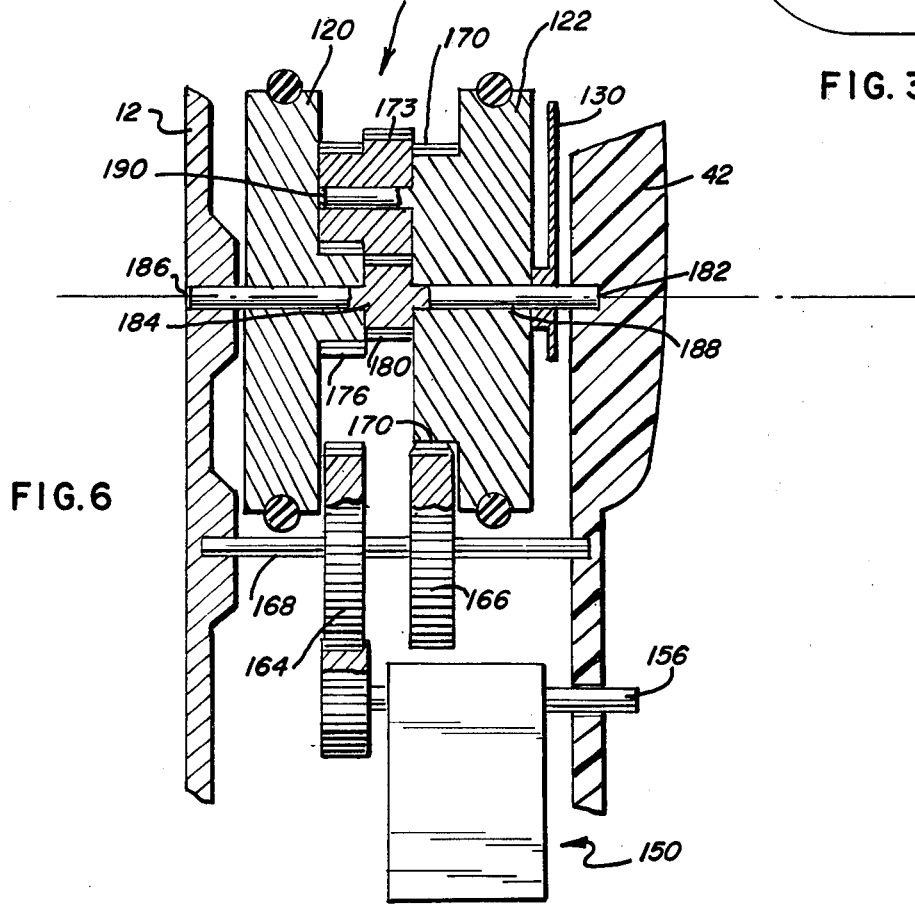

MECHANICAL PROTRACTOR

BACKGROUND OF THE INVENTION

A. Field of the Invention

The device of the present invention relates generally to a new and improved instrument for measuring the angle between two lines without the necessity of extending the lines to a point of intersection.

B. Description of the Prior Art

It is often necessary to determine the angle between two lines on a drawing or the like. Often the lines do not intersect within the area of the drawing but, rather, intersect outside of the sheet. In these circumstances, measuring the angle between the lines using a prior art protractor or other similar instrument becomes more difficult and complicated.

Often times it is necessary to attach a second sheet to the drawing so that the lines may be extended to a point of intersection. Once the lines are extended to intersection, the angle between the lines may be measured by a standard prior art protractor. In cases where the lines cannot conveniently be extended to a point of intersection, other more complicated and less accurate methods must be utilized. These methods require lines parallel to at least one of the lines defining the angle to be measured to be generated so that a point of intersection measurable by a protractor is obtained. The generation of such parallel lines increases the complexity of the measurement and can introduce inaccuracies. When the angle between two elongated physical objects, such as a pair of walls, is to be measured the measurement becomes even more difficult.

SUMMARY OF THE INVENTION

An object of the present invention is to provide a new and improved device for measuring the angle between two lines.

Another object of the present invention is to provide a new and improved device for measuring the angle between two lines on a drawing or between two elongated objects such as walls or the like.

A further object of the present invention is to provide a new and improved device for measuring the angle between two lines on a drawing or the like without extending the lines to their point of intersection.

An additional object of the present invention is to provide a device for accurately measuring the angle between two lines independently of the path taken by the device to obtain the measurement.

Briefly, the present invention is directed to a new and improved device for measuring the angle between two lines on a drawing, or between two physical objects. A preferred embodiment of the device or mechanical protractor according to the invention includes a housing having one open side that may be covered by a transparent window or the like. A pair of wheels each preferably having substantially the same configuration and size is rotatably mounted within the housing. Extending between the wheels is a shaft having its first end secured to the first wheel and its second end passing through the second wheel and into the open side of the housing. The shaft maintains the wheels separated by a distance predeterminedly related to the radii of the two wheels, preferably by a distance approximately equal to the radius of each wheel. A scale calibrated in degrees is affixed to the second wheel, and a pointer is secured to the second end of the shaft and adjacent the scale.

The outer peripheral surfaces of the first and second wheels extend through the bottom of the housing so that the housing may be moved on the surface of the drawing (or floor) from one line (or wall) to another causing independent rotation of the first and second wheels. The rotation imparted to the first wheel by movement of the housing causes the pointer to rotate. The rotation imparted to the second wheel by moving the housing along the surface of the paper or the like imparts a similar rotation to the second wheel and, thus, to the calibrated scale on the face of the second wheel.

The difference in rotation between the first and second wheels represents the angular travel of the device. This difference in rotation is indicated by the position of the pointer relative to the scale. Hence, as the device is moved along a path from one point to another on a drawing, this relative position indicates in degrees the angle between the starting and stopping points of the device of the present invention.

In the embodiment discussed above, the scale on the face of the second wheel ranges from 0° to 360°. However, to allow a more accurate reading of the angle, a gear train or other rotational movement translation device may be interposed between the first wheel and the pointer to reduce the amount of relative motion between the pointer and the scale for a given angle traveled by the device. If a translation device having a step-up ratio of 2:1 for rotating the pointer two turns for each rotation of the first wheel is used, the scale on the face of the second wheel in this embodiment would extend from 0° to 180° for one full revolution of the pointer.

The device of the present invention may also include a total linear distance indicating element for indicating the total linear distance traveled by the device of the present invention. The indicating element may be an odometer type device calibrated in feet and inches or other suitable units and actuated by one of the wheels so that any linear movement of the device will be imparted to the indicating element which records the total linear distance traveled by the device. Alternatively, a tape rule may be mounted within the housing for measuring distance.

In an alternative embodiment, the relative rotation of the two wheels may be measured electrically by a variable resistor having a resistive element mounted for rotation with the first wheel and a contact mounted for rotation with the second wheel. The variable resistor is electrically connected to a voltmeter or other indicator calibrated in degrees for indicating the measured angle between the lines in response to the setting of the variable resistor.

BRIEF DESCRIPTION OF THE DRAWINGS

The above and other objects and advantages and novel features of the present invention will become apparent from the following detailed description of the preferred embodiment of the invention illustrated in the accompanying drawings wherein:

FIG. 1 is a fragmentary illustration of a mechanical protractor constructed in accordance with the principles of the present invention;

FIG. 2 is an elevational view of the scale of the mechanical protractor illustrated in FIG. 1;

FIG. 3 is a schematic illustration of the principle of operation of the mechanical protractor illustrated in FIG. 1;

FIG. 4 is a fragmentary, exploded view of another embodiment of the mechanical protractor according to the invention incorporating a linear distance measuring device;

FIG. 5 is an exploded view of an embodiment of the present invention utilizing a different linear distance measuring device;

FIG. 6 is a fragmentary, cross-sectional view of the device illustrated in FIG. 5;

FIG. 7 is a fragmentary, perspective view of the device illustrated in FIG. 6;

FIG. 8 is an elevational view of a scale of the device illustrated in FIG. 5; and FIG. 9 is a schematic illustration of an electrical embodiment of the present invention.

DESCRIPTION OF THE PREFERRED EMBODIMENT

Referring now to the figures, and specifically to FIGS. 1 and 7, there is illustrated a mechanical protractor designated as a whole by the reference numeral 10 (or 110). This mechanical protractor 10 may be employed to measure and indicate the angle between any two lines, such as, for example, between two lines on a blueprint or between two walls in a building.

The mechanical protractor 10 has a housing 12 and is designed to be placed on the surface containing the angle to be measured, for example, on a blueprint or on a floor between two walls. When a measurement is made, a front side 14 of the housing 12 is aligned with one of the lines 16 on the surface, and the protractor 10 is then moved along the surface until its front side 14 is in alignment with the second line 18. This movement results in the rotation of a pair of wheels 20 and 22, and the difference in rotation of the wheels 20 and 22 relative to each other is proportional to the angle between the two lines 16 and 18.

In the illustrated embodiment, the wheels 20 and 22 of the mechanical protractor 10 each have substantially the same radius R, and are mounted for independent rotation with respect to each other. The wheels 20 and 22 are separated a predetermined distance from each other by a shaft 24 that may be integral with or fixedly secured to the wheel 20. The shaft 24 has a reduced axle portion 26 that passes through an aperture 28 located at the center of the wheel 22. The wheel 22 fits on the reduced portion 26 and may be rotated relative to the shaft 24. The enlarged portion of the shaft 24 is dimensioned to maintain a fixed distance L between the wheels 20 and 22. In the preferred embodiment illustrated, the distance L is made substantially equal to the radius R for reasons discussed in a subsequent portion of the specification.

A pointer 30 is fixedly secured to a second reduced portion 32 of the shaft 24. The pointer 30 is fixedly attached to the reduced section 32 so that it rotates with the shaft 24 and, thus, with the wheel 20.

Also, in accordance with the principles of the present invention, a scale 34 (FIG. 2) indicating degrees is disposed on an outside surface 36 of the wheel 22. In the illustrated embodiment, the scale is calibrated in degrees over the range of 0° to 360° (FIG. 2). The scale 34 rotates with the wheel 22, and as a result, the pointer 30 and the scale 34 rotate independently of one another, each rotating with a different one of the wheels 20 and 22, respectively. The scale 34 may be imprinted on or otherwise secured to the wheel 22.

The wheels 20 and 22 are rotatably mounted within the housing 12. The wheel 20 is rotatably secured within the housing 12 by an axle rod 38 inserted into an aperture 40 formed in one wall of the housing 12. In addition, the housing 12 includes a side wall 42 fabricated from a transparent material such as plastic, or the like, so that the pointer 30 and scale 34 may be read by the user. A second axle rod 44 secured to or integrally fabricated with the shaft 26 fits into an aperture 46 formed in the side wall 42 to provide further support for the wheels 20 and 22. The wheels 20 and 22 are positioned within the housing 12 so that the peripheral surfaces of the wheels 20 and 22 extend through apertures 48 and 50 formed in the bottom of the housing 12 and engage the surface on which the angle to be measured lies. Since the wheels 20 and 22 travel over a surface on which the angle lies, rubber rings 52 and 54 are mounted in grooves 56 and 58, respectively, formed in the outer periphery of the wheels 20 and 22. The rubber rings increase the traction to the surface and result in a more accurate reading in degrees.

As previously mentioned, the mechanical protractor 10 measures the relative rotation of the wheels 20 and 22 as the mechanical protractor 10 is moved along a surface in order to measure the angle between two lines on that surface. An example of how the difference in relative rotation may be used to measure an angle is given in the following description in conjunction with FIG. 3. In the example illustrated in FIG. 3, the angle between lines CD and EF is to be measured. To make such a measurement the front 14 of the housing 12 may be initially placed along line CD and moved along the surface until the front 14 of the housing is aligned with the line EF. In so doing, the mechanical protractor 10 is first moved so that wheels 20 and 22 travel along the paths A-A1 and B-B1, respectively. Along this path, the wheel 20 will travel a greater distance than wheel 22. The difference in the distance traveled by wheels 20 and 22 is designated, in this example, as the difference $X_1$. To complete the measurement, the mechanical protractor 10 is moved along the surface so that the wheels 20 and 22 travel the respective paths A1-A2 and B1-B2. Along this path, the wheel 22 will travel a greater distance than the wheel 20, and the difference in distance traveled by the two wheels may be designated as $X_2$.

As designated in FIG. 3, the radius of the curved section of the path traveled by wheel 22 between B and B1 is $r_1$, and the radius of the curved section of the path traveled by wheel 20 between A1 and A2 is $r_2$. Beginning with the formula circumference = diameter times $\pi$, it can be shown that in cases such as the present example, where the lines CD and EF are parallel, $X_1$ will equal $X_2$ regardless of the radius $r_1$ and $r_2$ of the paths if the radius R of the wheels 20 and 22 and the distance L between them remains the same. More specifically, the distance traveled by wheel 22 over the curved portion of the path B-B1 equals $((2r_1) \pi/4)$. The four in the denominator results because the protractor has traveled only 90° out of the 360° that form a complete rotation. The distance traveled by wheel 20 over the curved portion of the path A-A1 equals $(2(r_1 + L) \pi/4$ or $(2r_1\pi + 2L \pi/4)$. Subtracting the two equations, the difference in the distance traveled by the wheels 20 and 22 over the curved portion from line CD to line GH or $X_1$ equals $(2 \pi L/4)$, with the wheel 20 traveling the greater distance.

Computing the difference $X_2$ in a similar manner, the distance traveled by the wheel 20 over the curved portion of the path A1-A2 equals $(2\pi r_2/4)$, and the distance traveled by wheel 22 over the curved portion of the path B1-B2 equals $(2\pi(r_2 + L)/4)$ or $(2\pi r_2 + 2\pi L/4)$. The difference $X_2$ in distance traveled by wheels 20 and 22 over the curved portions equals $(2\pi L/4)$, with the wheel 22 traveling the greater distance.

Hence, the difference in the distance traveled by wheels 20 and 22 is dependent on the distance L between them (and the angle through which the potentiometer 10 was turned), and not on the path taken between the points or lines to be measured. Moreover, in the particular example illustrated in FIG. 3, each wheel 20 and 22 traveled, in total, the same distance along one of the respective paths A-A2 and B-B2. Consequently, the relative position of the pointer 30 and the scale 34 at the end of the measurement will be the same as at the beginning, 0°; thus indicating that the lines CD and EF are parallel. With the wheels positioned at the intermediate points A1 and B1, the pointer would have indicated 90°, thus indicating that the line GH is perpendicular to the line CD.

The scale 34 of the mechanical protractor 10 can be calibrated empirically by rotating the protractor 10 through premeasured angles of varying degrees, and marking the point where the pointer 30 is positioned on the outside face 36 of wheel 22 with an indication corresponding to the measured angle. In addition, if the values of R and L are known, the scale can be calibrated mathematically using an approach similar to that described in conjunction with FIG. 3, and converting the differences $X_1$ and $X_2$ into degrees from the relation that distance covered equals $2\pi R$ for one revolution or 360° of rotation of the wheel. For differences X (i.e., $X_1$ or $X_2$) corresponding to less than one revolution, the relative rotation between the wheel would correspondingly be smaller, for example 90° between A and A1 and B and B1 if R equals L.

In the embodiment of the present invention, shown in FIGS. 1, 4 and 7, the scale 34 will range from 0° to 360° full scale (FIG. 2), or alternatively ± 180° to about 0°. A full scale reading corresponds to one revolution of wheel 22 with respect to the pointer 30. To illustrate, if the wheel 22 is placed at point G in FIG. 3 and wheel 20 were placed at point B on line CD and the mechanical protractor 10 were rotated 360° about point G, a full scale measurement of 360° would result. This is because R equals L and the circumference of the circle traveled by the wheel 20 (i.e., the distance traveled by the wheel 20) equals the circumference of the wheel 20. Hence, one full revolution of wheel 20 is required for the protractor to be completely rotated about the point G, and one full revolution of the wheel 20 in this embodiment corresponds to a measured angle of 360°.

In using the mechanical protractor 10, it may become desirable to measure the linear distance between two points in addition to obtaining a reading of the angle between two lines. Accordingly, it may be desirable to incorporate a linear distance measuring device in the mechanical protractor 10. One such embodiment is illustrated fragmentarily in FIG. 4. In this embodiment, in addition to the wheels 20 and 22 and the shaft 24 with the pointer 30 and scale 34 comprising the angle measuring apparatus, there is included a tape rule 60 that may be mounted around shaft 24 to extend through the housing 12 in a manner similar to that of a tape measure. In this manner, the distance between two points may be conveniently measured by the tape rule 60 included in the protractor 10, and the need for carrying a tape measure or the like is eliminated.

In a third alternative embodiment of the present invention as illustrated in FIGS. 5-7, there is provided a protractor 110, similar to the protractor 10, including alternative means for indicating the total linear distance traveled by the mechanical protractor 110. A mechanism for expanding the scale is also provided. Two wheels 120 and 122 (FIG. 5) of a similar configuration and size to the wheels 20 and 22 are provided to drive a linear distance indicating device 150. This linear indicating device 150 may be a standard odometer type counter actuated by a gear 152 mounted on a shaft 154. The indicator 150 includes a manual reset button 156 that upon being depressed resets the numeral indicator dials 158, 160 and 162 to zero. The dials 158, 160 and 162 are rotated in a manner well known in the art by the shaft 154.

The indicator 150 displays the distance traveled by the mechanical protractor 110 by measuring the total distance traveled by the wheel 122. This is accomplished through a gear network including a pair of gears 164 and 166 mounted on a shaft 168 (FIG. 5). As illustrated in FIG. 6, a shaft 168 is rotatably mounted within the housing 12. The gear 164 meshes with the gear 152, and rotation imparted to the gear 164 is correspondingly imparted to the gear 152 thus rotating the indicator dials 158, 160 and 162. The gear 164 is rotated by a shaft 168 that in turn is rotated by gear 166. The gear 166 meshes with, and is rotated by a gear 170 that is integrally fabricated with (in this embodiment) or fixedly attached to the wheel 122. Accordingly, as the wheel 122 is rotated during movement of the mechanical protractor 110, this rotational movement is transferred to the indicator 150 through the gear network including gears 170, 166, 164 and 152.

The mechanical protractor 110 further includes structure that allows the scale 134 to be calibrated from 0° to 180° for one revolution of the wheel 122 relative to the wheel 120. The scale expanding structure includes a step-up gear generally indicated as 172 that includes a large gear 173 and a smaller gear 174. The gear 174 meshes with a gear 176 affixed to the wheel 120, and the gear 173 on the step-up gear 172 meshes with a gear 180 that is attached to shaft 182. The sizes of the gears 173, 174, 176 and 180 are selected to provide a 2:1 step-up ratio to the shaft 182. The shaft 182 corresponds to the shaft 24 in the previous embodiment in that it supports the wheel 120 and passes through an aperture 184 in wheel 120. The shaft 182 is rotatably attached to the wheels 120 and 122 and rotatably mounts wheels 120 and 122 to the housing 12 by passing into an aperture 186 (FIG. 6) fabricated in the housing 12. In addition, the shaft 182 also extends through an aperture 188 in the wheel 122 allowing the pointer 130 to be attached to an end of the shaft 182 adjacent the outer surface 134 of wheel 122. The step-up gear 172 is rotatably secured to the wheel 122 by an eccentrically placed shaft 190 extending from the wheel 122.

When there is no relative rotation between the wheels 120 and 122, the shaft 190 and the gear 172 rotate in synchronism with the wheels 120 and 122, and consequently, there is no relative rotation between the gears 174 and 176. As a result, there is no relative rotation between the gears 173 and 180, and the shaft 182 and the pointer 130 are rotated in synchronism with the wheels 120 and 122 by the gear 172 revolving about the gear 180.

If the relative rotation of the wheels 120 and 122 occurs, the relative rotation of the wheel 120 is transmitted from the gear 176 to the gear 174, and then through the gears 173 and 180 to the shaft 182 and the pointer 130. Due to the 2:1 ratio of the gear train, the shaft 182 rotates twice as fast as the wheel 120 when the wheel 120 is rotated and the wheel 122 is held stationary. Accordingly, one half of a revolution of the wheel 120 corresponds to a 360° rotation of pointer 130 as opposed to the rotation of 180° of the embodiment illustrated in FIG. 1. Consequently, the scale is expanded by a faction of two, and the scale 134 now reads 0° to 180° (or 0 to ±90°), rather than 0° to 360°, and permits more accurate readings to be taken. The scale 134 also includes a second range of calibrations ranging from 180° to 360° to permit larger angles to be measured. This second range is read if the pointer rotates more than one revolution during the measurement.

The mounting of the wheels 120 and 122 in the housing 12 is best illustrated in FIG. 7. In this figure, the indicator 150 has been elevated from the position illustrated in FIG. 6, and the lower portion of housing 12 and the side or transparent window of the housing 120 has been removed to facilitate illustration. As illustrated, the bottom 192 of the housing 12 includes apertures 48 and 50 through which wheels 120 and 122, respectively, extend so that the lower portion of the periphery of each wheel 120 and 122 may contact the surface containing the distances or angles to be measured.

To provide a stable and movable surface for the housing 12, an aperture 197 is formed in the bottom 192 onto which a steel ball 198 is mounted. The ball 198 is rotatably held in position by holding plate 200 that is secured to the bottom 192 by rivet 202 and provides additional support to the mechanical protractor 110 (or 10) as it is moved along the surface.

As illustrated in FIG. 7, the mechanical protractor 110 allows the angle X° between a pair of lines 16 and 18 to be conveniently measured in the following manner. The wheels 120 and 122 are first rotated until the pointer 130 points to 0° on the scale 134. Alternatively, a reset button (not shown) similar to the button 156 used to reset the distance measuring counter 150 may be used to reset the pointer 130. The front edge 14 of the housing 12 is then aligned with the line 16, and the mechanical protractor 110 is moved along any path until the leading edge 14 of the housing 12 is parallel with the line 18. The angle X° between lines 16 and 18 may then be read directly from the position of the pointer 130 relative to the scale 134. In addition, the linear distance traveled by the mechanical protractor 110 may be read from the indicator 150 and specifically the indicator dials 158, 160 and 162.

An electrical embodiment of the mechanical protractor is illustrated in FIG. 9. The electrical embodiment utilizes a variable resistor 300 that includes a resistive element 302. One end of the element 302 is connected to a ring 304 made of a conductive material such as copper by a connecting element 306. The assembly containing the copper ring 304 and resistive element 302 may be placed on either wheel 20 or 22 in the mechanical protractor 10. For example, in the preferred embodiment, the copper ring 304 is secured to the inner surface of the wheel 20 and the resistive element 302 is secured to the inner surface of the wheel 22.

The variable resistor 300 also includes a wiper contact 308 that contacts the resistor 302. The contact 308 is connected to a second conductive ring 310, which may also be made of copper, by a connecting element 312. The contact element 308 is mechanically coupled to the wheel 22 and rotates with the wheel 22. Stationary contacts 314 and 316 are placed on the rings 310 and 304, respectively, and act as brushes allowing the rings 310 and 304 to rotate while maintaining contact with the rings.

Electrical leads 318 and 320 are connected to a circuit 329 including resistors 322, 324, 326 and 328 of, preferably equal value, and connected in series with the variable resistor 300 to form a bridge circuit with a voltmeter 334. The battery 330 supplies power to the circuit 329 when the switch 332 is closed. Accordingly, when the variable resistor 300 is set at zero resistance, the bridge is balanced and the voltage across the leads 336 and 338 of the voltmeter 334 is substantially zero. The variable resistor 300 will have a resistance value proportional to the position of the contact 308 on the resistive element 302. The position of the contact 308 will, in turn, be determined by the different distances traveled by the wheels 20 and 22 as previously discussed. The variable resistance will cause variable voltage to appear across the leads 336 and 338 to voltmeter 334, thereby resulting in a reading proportional to the difference in rotation of the wheels 20 and 22. The scale on the voltmeter 334 can be calibrated to indicate angular degrees, radians or any convenient units to provide a direct readout of the angle measured by the mechanical protractor. A digital voltmeter, calibrated in degrees, may be used as the voltmeter 334 if a digital readout is desired.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for measuring angles comprising:
   first and second spaced wheels;
   a shaft between said first and second wheels, said wheels being mounted on said shaft for independent rotation; and
   means for indicating the difference in rotation of said first and second wheels including a pointer attached to said shaft, means for rotating said pointer proportionally with the rotation of said first wheel and indicia disposed on a surface of said second wheel adjacent to said pointer.

2. Apparatus as recited in claim 1 wherein said first and second wheels have substantially similar radii.

3. Apparatus as recited in claim 1 wherein said shaft is fixedly attached to said first wheel for rotation therewith and extends through said second wheel, said second wheel is rotatably mounted to said shaft and said pointer rotating means includes means for fixedly attaching said pointer to the portion of said shaft extending through said second wheel.

4. Apparatus as recited in claim 1 wherein said first and second wheels are rotatably attached to said shaft and said apparatus includes rotational motion translating means coupling said first wheel and said shaft for rotating said shaft proportionally to the rotation of said first wheel.

5. Apparatus as recited in claim 1 further including means mechanically coupled to one of said wheels for indicating the total distance traveled by said one wheel.

6. Apparatus as recited in claim 1 wherein said apparatus further includes a linear distance measuring device.

7. Apparatus for measuring angles comprising:
first and second spaced wheels mounted for independent rotation; and
means for indicating the relative difference in rotation of said first and second wheels including variable resistance means comprising a resistive member affixed for rotation proportionally with the rotation of said first wheel, and contact means affixed for rotation proportionally with the rotation of said second wheel and electrically contacting said resistive member, and wherein said indicating means includes means electrically coupled to said variable resistance means and responsive to the position of said contact member on said resistive member for indicating the angular movement of said apparatus represented by the relative rotation between said first and second wheels.

8. Apparatus for measuring angles on a surface comprising:
means for travelling along said surface including first and second independently rotatable members for engaging said surface;
a first rotatable element;
a second rotatable element;
means for rotating said first rotatable element proportionally to the rotation of said first rotatable member;
means for rotating said second rotatable element proportionally to the rotation of said second rotatable member; and
means affixed to said first and second elements for visually indicating the angle travelled along said surface, said indicating means including an indicator and indicia calibrated to indicate said angle, said indicator and indicia being mounted for relative movement in response to the relative rotation of said elements.

9. Apparatus as recited in claim 8 wherein said first and second rotatable members comprise first and second wheels, respectively, of substantially the same dimensions.

10. Apparatus as recited in claim 9 wherein said first rotating element comprises a shaft having a predetermined length, and includes means for maintaining the distance between said wheels substantially equal to the radius of said wheels.

11. Apparatus as recited in claim 8 further including means for indicating the total distance traveled by one of said wheels.

12. Apparatus as recited in claim 8 wherein said first rotatable element comprises a resistive element, and said second rotatable element comprises a contact member electrically contacting said resistive element, and said relative rotation indicating means includes a voltage responsive display device electrically connected to said resistive element and said contact member.

13. A device for measuring the angle between two lines comprising:
a housing;
a shaft rotatably mounted within said housing;
first and second wheels independently rotatably mounted within said housing;
means for rotating said shaft proportionally to the rotation of said first wheel coupling a first end of said shaft to said first wheel, and shaft having a second end extending through said second wheel;
a pointer secured to said second end of said shaft; and
angular indicia on said second wheel arranged to cooperate with said pointer.

14. A device as recited in claim 13, wherein said first and second wheels have substantially equal radii, and are separated by a distance substantially equal to the radius of said wheels.

15. A device as recited in claim 13 wherein said first end of said shaft is attached directly to said first wheel.

16. Apparatus as recited in claim 8 wherein said relative rotation indicating means includes a pointer affixed to said first rotatable element and indicia disposed on said second rotatable element.

17. Apparatus as recited in claim 8 wherein said first rotatable element is integrally formed with said first rotatable member to form a single unit.

18. Apparatus as recited in claim 8 wherein said second rotatable element is integrally formed with said second rotatable member to form a single unit.

* * * * *